United States Patent [19]

White, Jr.

[11] 4,416,647
[45] Nov. 22, 1983

[54] BELT TENSIONER

[75] Inventor: Jack D. White, Jr., Springfield, Mo.

[73] Assignee: Dayco Corporation, Dayton, Ohio

[21] Appl. No.: 267,190

[22] Filed: May 26, 1981

[51] Int. Cl.³ .......................... F16H 7/12; F16H 7/10
[52] U.S. Cl. ................................. 474/134; 474/137; 474/138; 474/135
[58] Field of Search ............... 474/133, 134, 135, 136, 474/137, 138

[56] References Cited

U.S. PATENT DOCUMENTS

| 1,257,660 | 2/1918 | Willis | 474/134 |
|---|---|---|---|
| 1,578,700 | 7/1925 | Anderson | . |
| 1,809,481 | 7/1931 | Haussmann | 474/137 |
| 2,010,056 | 8/1935 | Brush | 474/134 |
| 2,945,393 | 7/1960 | Paulson | 474/134 |
| 3,142,193 | 11/1961 | Polko et al. | 74/242.11 |
| 3,545,294 | 12/1970 | Pankowski | 474/133 |
| 4,069,719 | 1/1978 | Cancilla | 474/137 |
| 4,351,636 | 9/1982 | Hager | 474/138 |

FOREIGN PATENT DOCUMENTS

| 174480 | 9/1906 | Fed. Rep. of Germany | 474/134 |
|---|---|---|---|
| 918162 | 2/1963 | United Kingdom | 474/134 |

OTHER PUBLICATIONS

IBM Technical Disclosure Bulletin vol. 17, No. 5, Oct. 1974, R. B. Shuman "Compensating Idler System for Bi-Directional Belt Drive".

Primary Examiner—Lawrence J. Staab
Assistant Examiner—Michael D. Bednarek
Attorney, Agent, or Firm—Joseph V. Tassone

[57] ABSTRACT

A tensioner for an endless power transmission belt is provided wherein such belt is employed in driving a sheave comprising at least one accessory which upon being driven creates a slack side and a tight side in the belt on opposite sides of the sheave and the tensioner comprises, a first support arm having pivot means, a first idler pulley rotatably carried by the arm, and a pivot pin extending through the pivot means and supporting the first arm adjacent the sheave with the first pulley engaging the slack side to enable tensioning thereof; and, the tensioner further comprises a second support arm supported by the pivot pin, a second idler pulley rotatably carried by the second arm and engaging the tight side of the belt, and means connecting the second arm to the first arm to thereby move the first arm and its pulley into belt tensioning and dampening engagement against the slack side once the tight side of the belt moves the second pulley and second arm.

15 Claims, 7 Drawing Figures

BELT TENSIONER

BACKGROUND OF THE INVENTION

1. Field of the Invention

This invention relates to a tensioner for an endless power transmission belt which provides both belt tensioning and dampening.

2. Prior Art Statement

In the art of transmitting power employing an endless polymeric power transmission belt, such as driving or rotating driven sheaves of a plurality of automobile accessories using a belt which is driven by a driving sheave connected to the automobile engine crankshaft, it is difficult to maintain such belt under tension required to assure non-slipping engagement and driving of the driven sheaves; and, numerous belt tensioners have been proposed and used heretofore in an effort to provide the required tension. Especially where one of the accessories being driven is the compressor of an air conditioning system for the automobile, such compressor upon being driven creates a tight side and a slack side in the belt on opposite sides of the compressor sheave. The tight side has a varying tightness of a cyclic character as a function of the inherent cyclic change in the load imposed by the compressor. It is a problem to provide the required tension in the overall belt as well as prevent any tendency of the belt to oscillate in an undesirable manner as a result of this cyclic load change.

It is known in the art to provide a tensioner for an endless power transmission belt wherein the belt is employed in driving a sheave comprising at least one accessory which upon being driven creates a slack side and a tight side in the belt on opposite sides of the sheave and the tensioner comprises, a first support arm having pivot means, a first idler pulley rotatably carried by the arm, and a pivot pin extending through the pivot means and pivotally supporting the arm adjacent the sheave with the first pulley engaging the slack side to enable tensioning thereof and in a similar manner as disclosed in U.S. Pat. No. 3,142,193.

It is also known to utilize a pair of pulleys as a portion of a tensioner wherein such pair of pulleys are suitably disposed along the length of a belt to provide tensioning thereof and as disclosed in U.S. Pat. No. 1,578,700.

It is an object of this invention to provide an improved tensioner for an endless power transmission belt.

Another object of this invention is to provide an improved tensioner that also provides dampening of the belt and thereby assures smooth running thereof free of vibration and/or oscillation.

Other aspects, embodiments, objects, and advantages of this invention will become apparent from the following specification, claims, and drawings.

SUMMARY

In accordance with the present invention there is provided an improved tensioner for an endless power transmission belt which overcomes the above-mentioned problem. The improved tensioner is for an endless power transmission belt which is employed in driving a sheave comprising at least one accessory which upon being driven creates a slack side and a tight side in the belt on opposite sides of the sheave and the tensioner comprises, a first arm having pivot means, a first idler pulley rotatably carried by the arm, and a pivot pin extending through the pivot means and pivotally supporting the first arm adjacent the sheave with the first pulley engaging the slack side to enable tensioning thereof.

In accordance with one embodiment of this invention the tensioner comprises, a second support arm supported by the pivot pin, a second idler pulley rotatably carried by the second arm and engaging the tight side of the belt, and means connecting the second arm to the first arm to thereby move the first arm and its pulley into belt tensioning and dampening engagement against the slack side once the tight side of the belt moves the second pulley and second arm.

BRIEF DESCRIPTION OF THE DRAWINGS

The accompanying drawings show present preferred embodiments of this invention, in which.

DETAILED DESCRIPTION

Figure 1:
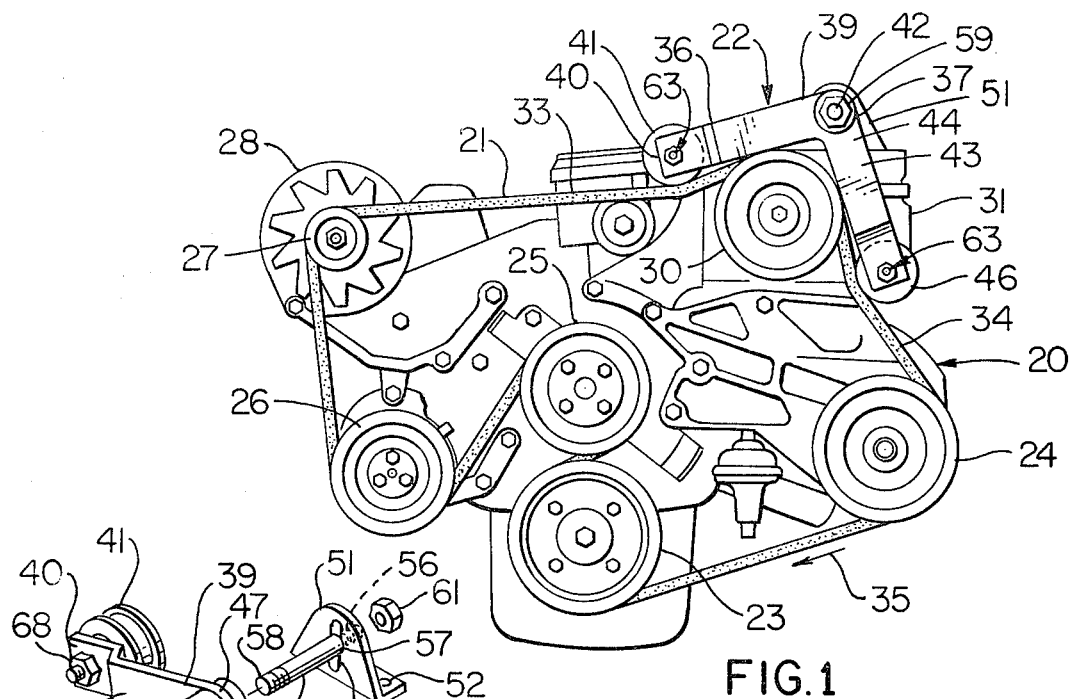
FIG. 1 is a view looking perpendicularly toward the front end of an automobile engine which utilizes one exemplary embodiment of the belt tensioner of this invention which is used to tension a belt employed in driving a plurality of accessories.

Reference is now made to FIG. 1 of the drawings which illustrates the front end of a motor vehicle engine, shown as an automobile engine, which is designated generally by the reference numeral 20; and, such engine utilizes an endless power transmission belt 21 for driving a plurality of driven accessories, as will be described subsequently, and a tensioner 22 for the driving belt 21. The tensioner is, in essence, a tensioner-dampener 21 which provides a tensioning and dampening function for the belt 21.

The endless power transmission belt 21 may be of any suitable type known in the art and is preferably made primarily of polymeric material. The belt 21 is driven by a driving sheave 23 which is operatively connected to the engine 20; and, in particular to the crankshaft of such engine, as is known in the art.

Through the use of belt 21, the driving sheave 23 of this example drives a sheave 24 of a power steering device used in an automobile (not shown) employing the engine 20, a sheave 25 comprising an engine water pump, a sheave 26 comprising an air pump of a type used in an antipollution system for the engine 20, a sheave 27 comprising an electrical unit such as an engine alternator 28, and a sheave 30 comprising a compressor 31 of an air conditioning system for the automobile employing the engine 20.

All of the driven accessories, through their sheaves, impose a load on the belt 21; however, the detailed description will proceed with the load imposed by the compressor 31 and its sheave, inasmuch as such load is generally of comparatively high magnitude. Accordingly, the compressor 31, upon being driven, creates a slack side 33 and a tight side 34 in the belt 20 upon turning on the air conditioning system in the automobile; and, such slack side 33 and tight side 34 are produced inasmuch as the belt is rotating clock-wise as indicated by the arrow 35 in FIG. 1.

The belt tight side 34 (and hence slack side 33) varies in tightness, i.e., magnitude of tightness, in a cyclic manner and as a function of the inherent cyclic change in the load imposed by the air compressor 31. This cyclic change in load varies between greater extremes in applications where the compressor 31 is of the piston type. The cyclic load imposed by the compressor 31 has a tendency to cause the slack side 33 of the belt 21 to vibrate or oscillate, and the tensioner 22 of this invention provides not only a belt tensioning function but also a belt dampening function.

Figure 2:
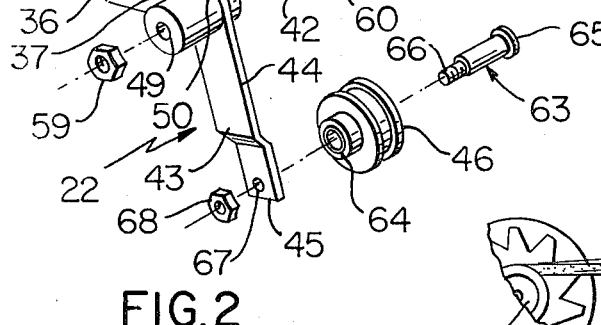
FIG. 2 is an isometric view of the exemplary tensioner of FIG. 1 with certain parts thereof exploded away to highlight the construction thereof.

As will be readily apparent from FIGS. 1 and 2 of the drawings the tensioner 22 comprises a first support arm 36 which is of extended length and has a pivot means 37 provided at its outer end. The arm 36 has an inner end portion or end 39, an outer end portion or end 40, and a first idler pulley 41 rotatably carried adjacent the outer end 40. The tensioner 22 also has a pivot pin 42 extending through the pivot means 37 for pivotally supporting the first arm 36 adjacent the sheave 30 of the air compressor 31 with the first pulley 41 engaging the slack side 33 of the belt 21 to enable tensioning thereof.

In accordance with this invention, the tensioner 22 comprises a second support arm 43 which has an inner end portion or end 44 and an outer end portion or end 45. The second arm 43 has a second idler pulley 46 rotatably carried thereby adjacent its outer end 45 with the second pulley 46 engaging the tight side 34 of the belt 21. The tensioner 22 also has means 47 connecting the second arm 43 to the first arm 36 to thereby move the first arm 36 and its pulley 41 into belt tensioning and dampening engagement against the slack side 33 of the belt 21 once the tight side 34 of the belt moves the second pulley 46 and the second arm 43.

The connecting means 47 may be any suitable means known in the art; however, in this example of the invention such connecting means comprises fixing means defined as a structural portion 47 which fixes the inner end 44 of the second arm 43 to the inner end 39 of the first arm 36. The portion 47 of this example is defined as an integral part of the inner ends of arms 36 and 43 whereby these arms and portion 47 are a single-piece unitary structure in the form of a V-shaped structure. However, it is to be understood that arms 36 and 43 may be otherwise suitably fixed together, as by welding, or the like.

The tensioner 22 has pivot means 37, as previously mentioned, comprising same and such pivot means comprises a substantially cylindrical member 37 which has an axial bore 49 extending therethrough. The bore 49 is particularly adapted to receive the pivot pin 42 therewithin whereby the pivot pin 42 supports the entire tensioner 22 for pivoting movements. The inside surface of the member 37 defining bore 49 serves as a smooth bearing surface which is rotatably supported by the outside surface of the pivot pin 42. The pivot means or cylindrical member 37 is suitably attached to the inner end of the first arm 36 by suitable means, preferably weld means 50. In actual practice the single-piece V-shaped structure previously described may have an opening through its apex, i.e., through portion 47, which receives member 37 therethrough and member 37 is then welded in position by weld means 50.

The tensioner 22 also has means for attaching the pivot pin 42 at a fixed position and in this example of the invention such attaching means comprises a bracket 51. The pivot pin 42 is detachably fastened to the bracket 51 as will be described later. The bracket 51 has openings 52 therein for receiving threaded bolts which are used to fasten the bracket and hence the pivot pin 42 on the engine 20. It will also be seen that in the illustration of FIG. 1 the bracket 51 is used to attach the pivot pin 42 at a fixed position outwardly of the endless path of the belt 21 whereby the arms 36 and 43 of the tensioner 22 are disposed on opposite sides of the sheave 30 thereby, in essence, embracing same therebetween.

The tensioner 22 of this invention is especially effective in tensioning the belt 21. During operation of the belt 21 with the compressor 31 inoperative the belt 21 moves in the path shown in FIG. 1, and which is the same path shown by dotted lines in FIG. 3. The construction of the tensioner 22 and mounting thereof plus the configuration and the arrangement of the various accessories with their sheaves on the engine 20 are such that the tensioner is designed to provide the proper belt-tensioning function while normally driving all accessories.

Figure 3:
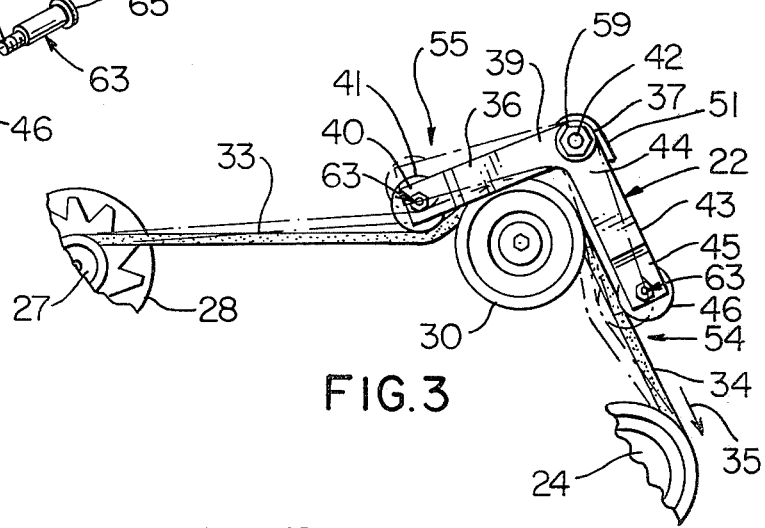
FIG. 3 is a fragmentary view particularly illustrating the manner in which idler pulleys of the tensioner engage opposite sides of a sheave comprising one accessory in the system of FIG. 1.

However, once the compressor 31 is turned, on a substantial load is imposed on the belt 21 and with the belt rotating clockwise as indicated by the arrow 35 in FIGS. 1 and 3 the magnitude of tightness in the tight side 34 of the belt adjacent the pulley 30 is substantially increased and slackness in slack side 33 becomes greater. Once this occurs, the pulley 46 moves from the dotted line position to the solid line position as shown at 54 in FIG. 3; and, simultaneously the arm 36 and its pulley 41 are moved into belt tensioning and dampening engagement from their dotted line positions to their solid line positions as illustrated at 55. This action is an automatic tensioning and dampening action in response to the turning on of the air conditioning compressor 31.

In applications where the compressor 31 is a piston type compressor it has a tendency to increase the tightness of tight side 34 in a cyclic manner as previously mentioned. However, even with a piston type compressor the pulley 46 and its arm 43 move in response to the cyclic change in load and thereby substantially simultaneously move the arm 36 and its pulley 41 into tensioning and dampening engagement against slack side 33 thereby assuring that the belt 21 will operate free of vibration or oscillation.

As previously mentioned, the means for attaching the pivot pin 42 at a fixed position comprises a bracket 51 as previously described. The pivot pin 42 has a reduced diameter threaded inner end portion 56 which defines a shoulder 57. The pivot pin 42 also has a threaded outer portion 58 which extends outwardly of the pivot means or cylindrical member 37, once the tensioner is installed on the engine 20, and a threaded nut 59 threadedly engages portion 58 to hold the tensioner 22 on pin 42.

To fasten the inner end of the pin 42 in position the threaded inner portion 56 thereof is extended through a slot 60 in the bracket 51. A threaded nut 61 is provided for fastening the threaded inner portion 56 against the bracket 51. With this construction it is a simple matter to detachably fasten the pin 42 to the bracket 51 simply by extending the threaded portion 56 through the slot 60 until the shoulder 57 engages the outside surface of the bracket 51. The nut 61 is then threaded in position fixing the inner end of the pin 42 to the bracket 51. The slot 60 is provided for the purpose of moving the pin 42 with the bracket 51 mounted at a fixed position on the engine 20 and thereby compensate for stretching and wear of belt 21 with extended use thereof.

Each of the arms 36 and 43 is preferably made of a high-strength rigid material preferably in the form of a high-strength metallic material. Each of the pulleys 41 and 46 is rotatably carried on its arm on shaft means or a shaft 63. The shaft 63 has a central portion which is particularly adapted to engage a sleeve bearing 64 of an associated pulley, either 41 or 46, and the shaft has a head portion 65 at one end and a threaded portion 66 at its opposite end. Each pulley, 41 or 46, is supported in position on its arm, either 36 or 43, respectively, by extending the threaded portion 66 through an opening 67 in the associated arm and threading a fastening nut 68 in threaded engagement with the threaded end 66 whereby the pulley is held against axial movements and is free to rotate about the central portion of the shaft 63.

Figure 4:
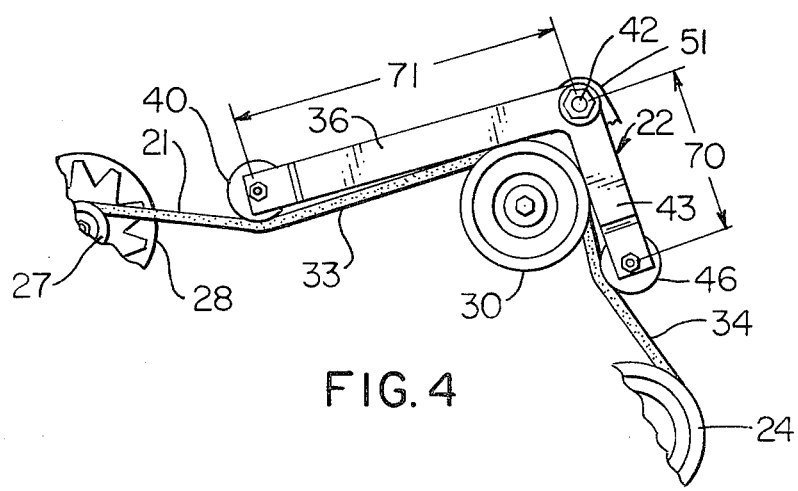
FIG. 4 is a view similar to FIG. 3 illustrating a modification of the tensioner of FIGS. 1-3.

In the presentation of FIGS. 1–3, the tensioner 22 is shown having arms 36 and 43 which are of equal length. A modification of such tensioner as illustrated in FIG. 4 and also designated by the reference numeral 22. The tensioner of FIG. 4 has an arm 43 which is substantially identical to the arm 43 previously described and has a length 70; and, components associated with arm 43 are identical to the previously described components. However, the arm 36 of this tensioner has a length or extension 71 which is longer than the length of the arm 43 and in this example the length 71 is twice the length 70. Also, the components associated with the longer arm 36 are identical to the previously described associated components.

The construction of arm 36 with a greater length makes it possible to provide a greater amount of slack side tensioning and dampening for any particular movement of the arm 43 due to the mechanical advantage provided by the longer arm. Also it is entirely within the concept of this invention to provide any suitable means known in the art for changing the length 71 of the arm 36 to provide an adjustable length arm.

Figure 5:
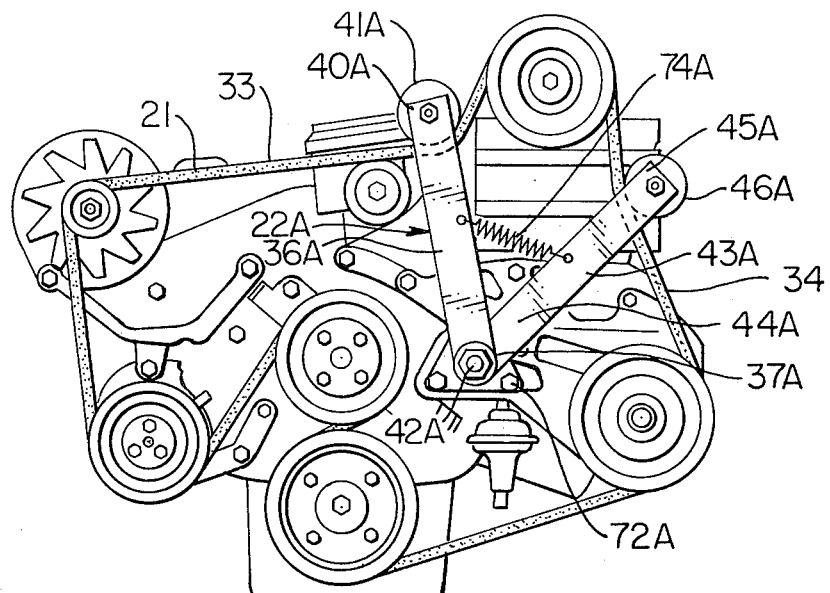
FIG. 5 is a view similar to FIG. 1 illustrating another exemplary embodiment of the tensioner of this invention employed to tension a belt on an engine similar to the engine of FIG. 1.
Figure 6:
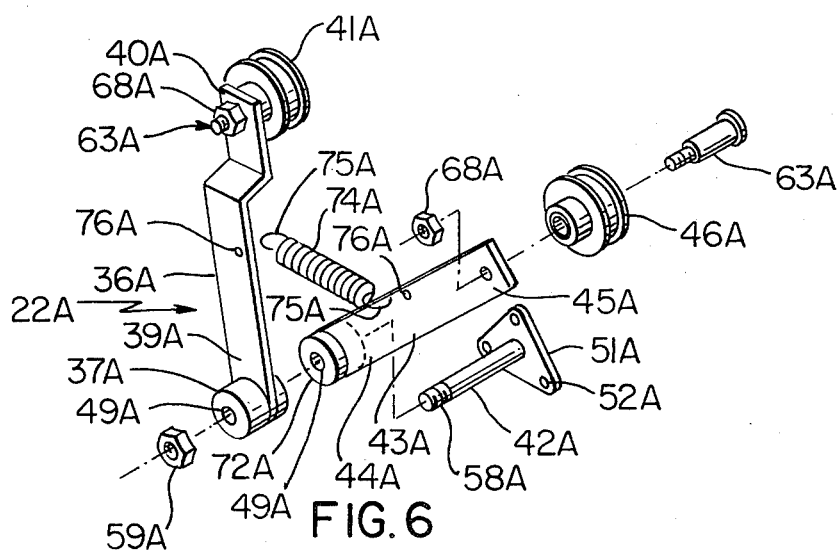
FIG. 6 is an isometric view of the tensioner of FIG. 5 with certain parts thereof exploded away to highlight the construction thereof.

Having described the tensioner 22, reference is now made to FIGS. 5 and 6 of the drawings which illustrate another exemplary embodiment of the tensioner of this invention. The tensioner is employed on an engine 20 having the sheaves and components as previously described and such sheaves and components will be designated by the same reference numerals as in FIG. 1 and will not be described in detail. The location of the compressor sheave 30 has been changed in FIG. 5 from its FIG. 1 location.

The tensioner of FIGS. 5 and 6 is very similar to the tensioner 22; therefore, such tensioner will be designated by the reference numeral 22A and representative parts of the tensioner 22A which are similar to corresponding parts of the tensioner 22 will be designated in the drawings by the same reference numerals as in the tensioner 22 (whether or not said representative parts are mentioned in the specification) followed by the letter designation A and not described again in detail. Only those component parts of the tensioner 22A which are different from corresponding parts of the tensioner 22 will be designated by a new reference numeral also followed by the letter designation A and described in detail.

The tensioner 22A has its first arm 36A, which is of extended length, and has pivot means 37A provided at the inner end 39A of such arm. The arm 36A also has first pulley 41A rotatably supported adjacent its outer end 40A by shaft 63A and nut 68A. The second arm 43A of tensioner 22A has an inner end 44A which has second pivot means 72A comprising same and the second arm 43A has second pulley 46A rotatably carried at its outer end 45A by cylindrical shaft 63A which is held in position on the arm 43A by threaded nut 68A.

The tensioner 22A is supported in position by pivot pin 42A and it will be seen that the pivot pin 42A extends through the second pivot means 72A and the pivot means 37A to thereby pivotally support both arms 36A and 43A and hence the entire tensioner 22A. The arms and tensioner are held in position against axial movement with respect to the pivot pin 42A by a threaded nut 59A. The nut 59A is threaded in position over threaded outer end 58A of the pivot pin 42A after placing the pivot pin in position.

The tensioner 22A has means for attaching the pivot pin 42A at a fixed position and such attaching means comprises a bracket 51A having openings 52A therein for receiving threaded bolts 72A (FIG. 5) therethrough, and threadedly fastening bracket 51A and hence pivot pin 42A in position on the engine 20.

The tensioner 22A also has means for connecting the second arm 43A to the first arm 36A to thereby move the first arm 36A and its pulley 41A into belt tensioning and dampening engagement against the slack side 33 of the belt 21 once the tight side 34 of the belt 21 moves the second pulley 46A and arm 43A in a similar manner as previously described. The connecting means in this example comprises a tension spring 74A which yieldingly urges the arms 36A and 43A toward each other and thus yieldingly urges the first pulley 41A and second pulley 46A in yielding engagement against the belt as seen in FIG. 5.

Each of the pivot means 37A and 72A previously described comprises a substantially cylindrical member having an axial bore therethrough which is designated by the same reference numeral 49A. The bores 49A receive the pivot pin 42A therethrough whereby the pin 42A pivotally supports the arms 36A and 43A and hence the entire tensioner 22A.

The spring means or spring 74A is a tension spring and has opposite end portions 75A detachably fastened to the arms 36A and 43A. In particular, it will be seen that the opposite end portions 75A of the tension spring 74A are hooking ends which are adapted to be inserted through associated openings 76A in the arms 36A and 43A as is known in the art thereby fastening the spring 74A in position to simultaneously provide urging of the arms 36A and 43A toward each other.

The connecting means or spring 74A between the arms 36A and 43A is, in essence, a yielding connection which assures that the pulleys 41A and 46A are held against the belt 21 in a yielding yet firm manner to assure provision of the tensioning function of the tensioner 22A. In addition spring 74A also assures movement of the arm 36A and its pulley 41A to provide a dampening function in the same manner as previously described for the tensioner 22.

The bracket 51A in this example is used to attach the pivot pin 42A of the tensioner 22A at a fixed position within the confines of the endless path of the belt and as seen in FIG. 5. It will also be seen that the major portions of the arms 36A and 43A of the tensioner 22A are also within the confines of such endless path.

Figure 7:
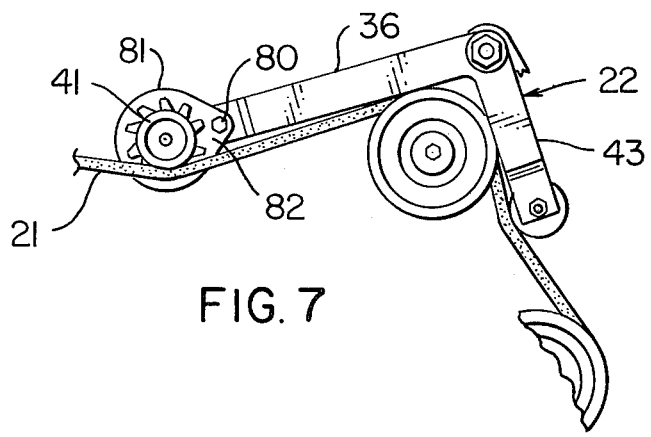
FIG. 7 is another modification of the tensioner of this invention.

A modification of the tensioner 22 of FIG. 4 is shown in FIG. 7 of the drawings. The tensioner of FIG. 7 also has its slack-side arm 36 made with a length which is twice the length of its tight-side arm 43. The extended length arm 36 is provided with means, shown as a threaded bolt 80, for detachably fastening a second accessory in the in the form of an electrical apparatus 81 thereon. The threaded bolt 80 extends through an opening in a flange portion 82 of the electrical apparatus and is threadedly received in a suitable threaded opening in the terminal end portion of the arm 36.

The arm 36 of the tensioner 22 of FIG. 7 has the pulley 41 associated therewith and such pulley comprises and serves as a drive for the apparatus 81. The electrical apparatus 81 provides an electrical output in response to a rotary input provided by the pulley 41, as driven by the belt 21, and electrical apparatus 81 may be a suitable reduced size and lightweight electrical apparatus in the form of an electrical alternator, or the like. Further, the construction of apparatus 81 and load imposed thereby is such that it may be readily driven by the outside portion of the endless belt 21.

In this disclosure of the invention the tensioner 22 is mounted with its pivot pin outside the confines of the endless path of the belt 21 and the tensioner 22A is mounted with its pivot pin inside the confines of the endless path of such belt; however, it is to be understood that these tensioners 22 and 22A may be modified and mounted with their pivot pins reversed if desired.

While present exemplary embodiments of this invention, and methods of practicing the same, have been illustrated and described, it will be recognized that this invention may be otherwise variously embodied and practiced within the scope of the following claims.

What is claimed is:

1. In the combination of a tensioner and an endless power transmission belt which is employed in driving a sheave comprising at least one accessory which upon being driven creates a slack side and a tight side in said belt on opposite sides of said sheave, said belt having an outside surface and an inside surface, said tensioner comprising, a first support arm having pivot means, a first idler pulley rotatably carried by said arm, and a pivot pin extending through said pivot means for pivotally supporting said first arm adjacent said sheave with said first pulley engaging said slack side of said belt on said outside surface thereof to enable tensioning thereof, a second support arm integrally formed with said first support arm, and supported by said pivot pin, a second idler pulley rotatably carried by said second arm and engaging said tight side of said belt on said outside surface thereof, and means connecting said second arm to said first arm to thereby move said first arm and its pulley into belt tensioning and dampening engagement against said slack side once said tight side of said belt moves said second pulley and second arm, said first arm being of extended length and having an inner end provided with said pivot means and said first pulley rotatably carried adjacent the outer end of said first arm, said second arm having an inner end and said second pulley rotatably carried adjacent the outer end of said second arm, said connecting means comprising means fixing said inner end of said second arm to said inner end of said first arm to define a substantially V-shaped unitary structure, the improvement wherein said first arm is longer than said second arm and said first pulley engages said slack side of said belt at a distance from said sheave greater than the distance said second pulley engages said tight side of said belt from said sheave whereby a greater amount of slack side tensioning than tight side tensioning is provided through the mechanical advantage of said first arm being longer than said second arm.

2. A combination as set forth in claim 1 in which said pivot means comprises a substantially cylindrical member having an axial bore extending therethrough for receiving said pivot pin therewithin.

3. A combination as set forth in claim 2 in which said fixing means comprises a structural portion which is defined as an integral part of said inner ends of said arms whereby said arms and structural portion are made as a single-piece structure.

4. A combination as set forth in claim 3 and further comprising means attaching said cylindrical member to said inner end of said first arm.

5. A combination as set forth in claim 1 in which said arms are fixed together to define a substantially V-shaped structure.

6. A combination as set forth in claim 1 in which said first arm is roughly two times longer than said second arm.

7. A combination as set forth in claim 1 and further comprising means attaching said pivot pin at a fixed position outwardly of the endless path of said belt and with said arms on opposite sides of said sheave and embracing same therebetween.

8. A combination as set forth in claim 1 in which said first arm has means detachably fastening a second accessory thereon, said first arm rotatably carrying said first pulley thereon, and said first pulley comprises and serves to drive said second accessory.

9. A combination as set forth in claim 8 in which said second accessory is an electrical apparatus which provides an electrical output in response to a rotary input provided by said first pulley.

10. A combination as set forth in claim 9 in which said means detachably fastening comprises a threaded bolt.

11. A combination as set forth in claim 1 in which said arms are made of rigid metal and further comprising a support shaft structure rotatably carrying each of said pulleys on its arm.

12. A combination as set forth in claim 1 and wherein said sheave of said one accessory upon being driven creates said tight side which has a varying tightness of a cyclic character as a function of an inherent cyclic change in the load imposed by said accessory, and said second arm responds to said varying tightness in a substantially instantaneous manner to move said first arm and its pulley into said tensioning and dampening engagement and thereby prevent any tendency of said belt to oscillate as a result of said cyclic load change.

13. A combination as set forth in claim 12 wherein said accessory is a compressor of an air conditioning system.

14. A combination as set forth in claim 13 wherein said belt is employed in driving a plurality of sheaves in addition to said first-named sheave wherein said plurality of sheaves correspond in number to the same plurality of accessories of an engine being driven by said belt during operation thereof in its endless path.

15. A combination as set forth in claim 14 wherein said endless power transmission belt is made primarily of polymeric material and is the sole means for driving said accessories which define all driven accessories of said engine which is the engine of an automobile.

* * * * *